United States Patent [19]

Brown et al.

[11] 4,124,246

[45] Nov. 7, 1978

[54] VEHICLE CAB MOUNTING

[75] Inventors: William J. Brown, Naperville; Gerald F. Molloy, Aurora, both of Ill.

[73] Assignee: Caterpillar Tractor Co., Peoria, Ill.

[21] Appl. No.: 815,957

[22] Filed: Jul. 15, 1977

[51] Int. Cl.² ............................................. B62D 33/06
[52] U.S. Cl. ................................. 296/28 C; 180/89.14
[58] Field of Search ..................... 296/28 C; 180/89.14

[56] References Cited

U.S. PATENT DOCUMENTS

| | | | |
|---|---|---|---|
| 3,279,559 | 10/1966 | Hirst, Jr. ........................... | 180/89.14 |
| 3,841,430 | 10/1974 | Babbitt et al. ..................... | 180/89.14 |
| 4,061,393 | 12/1977 | Blomstrom ......................... | 180/89.14 |

*Primary Examiner*—Richard A. Bertsch
*Attorney, Agent, or Firm*—Wegner, Stellman, McCord, Wiles & Wood

[57] ABSTRACT

An improved mounting for a cab to the frame of a vehicle wherein controls of the vehicle are resiliently mounted to the frame prior to the installation of the cab thereover. The cab includes a floor portion having openings adapted to permit the controls to extend upwardly therethrough. The cab may include additional portions mounted to the floor portion in the completed assembly of the vehicle with the additional portions defining enclosure portions for the controls. Upon installation of the cab, the controls may be rigidly secured thereto, permitting removal of the resilient mounting structure, as desired. The cab sections may be selectively installed so as to provide any one of a plurality of different cab arrangements. The temporary mounting of the controls by the resilient mounting structure permits the vehicle to be operated prior to the installation of the cab thereon for facilitated manufacture of the vehicle.

14 Claims, 4 Drawing Figures

VEHICLE CAB MOUNTING

BACKGROUND OF THE INVENTION

1. Field of the Invention

This invention relates to vehicle constructions and in particular to the mounting of a cab and control means in a vehicle, such as a tractor.

2. Description of the Prior Art

It is conventional to provide, on the frame of a tractor, an upstanding cab portion for enclosing the operator. Controls for steering and driving the vehicle are made accessible to the operator in the cab space.

It is further conventional in vehicles, such as tractors, to provide hydraulic auxiliary devices, such as bulldozer means, backhoe means, etc., and to provide in the cab space control levers for controlling the operation of the hydraulic devices.

The assembly of such vehicles, including the controls and cab means thereof, is a relatively expensive, time-consuming operation. Conventionally, the cab is installed on the frame of the vehicle and the controls subsequently installed in suitable portions of the cab and on the floor structure thereof. The frame portion of the vehicle is transported to different areas for assembly thereof with other portions of the vehicle, and conventional material handling transfer means is utilized in effecting such selective dispositioning of the frame during the assembly process.

A further problem in the prior art vehicle structures of this type arises in the difficulty of aligning the cab structure with the mounting means for the controls. Thus, it is conventional to provide the controls subsequent to the installation of the cab means.

SUMMARY OF THE INVENTION

The present invention comprehends an improved vehicle structure wherein the vehicle controls and cab means are mounted in the assembly in a new and improved manner.

More specifically, the invention comprehends the provision of improved means for mounting the controls of the vehicle resiliently prior to the installation of the cab structure on the frame thereof so as to permit facilitated assembly of the cab to the frame relative to the controls. Securing means are provided for rigidly securing the cab to the frame and for securing the controls to the cab.

Thus, the resilient mounting means permits adjustable positioning of the controls for facilitated securing of the cab thereto in effecting completion of the assembly operation.

The cab may have a floor portion which is provided with openings adapted to permit a portion of the controls to extend upwardly therethrough. A second portion of the cab is adapted to engage the control means as an incident of the cab being set upon the frame. The resilient mounting of the controls on the frame permits the accurate positioning of the controls relative to the cab in the final arrangement.

The cab may be formed of a plurality of interconnected sections permitting facilitated installation and providing for selective use of any one of a plurality of different sections so as to provide any one of a plurality of different cab arrangements.

The cab sections may be secured together by suitable removable means.

Portions of the additional sections of the cab may define wall means for enclosing portions of the controls in the cab space.

In the illustrated embodiment, the resilient mounting means comprises removable threaded support means and cooperating spring means.

The resilient mounting means may be removed upon the rigid securement of the cab to the frame and the rigid securement of the controls to the cab, if desired.

The mounting means may include removable clamping plates for securing the controls to the frame prior to the installation of the cab thereon.

Thus, the vehicle construction of the present invention is extremely simple and economical while yet providing highly improved and facilitated selective assembly of the controls in any one of a plurality of different configurations of cabs.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
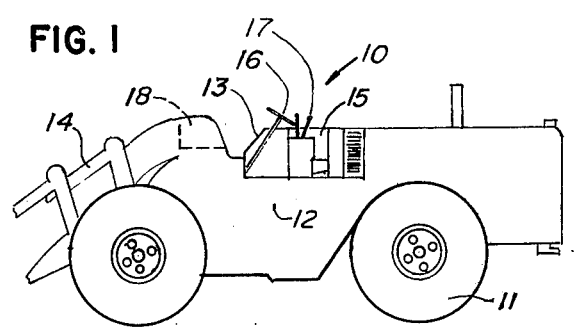
FIG. 1 is a side elevation of a vehicle embodying the invention.

In the exemplary embodiment of the invention as disclosed in the drawing, a vehicle generally designated 10 illustratively comprises a tractor having suitable drive wheels 11 rotatably mounted to a base portion 12 and a cab 13 mounted to the base portion. The tractor may be provided with earthworking apparatus, such as bucket 14.

In the illustrated embodiment, the cab defines an upwardly opening operator space 15 in which are provided a steering control 16 and an auxiliary hydraulic device control 17. Thus, illustratively, the operator may control the steering of the vehicle by use of the steering control 16 and may control the operation of associated hydraulic equipment, such as the bucket controlling hydraulic equipment 18.

Figure 3:
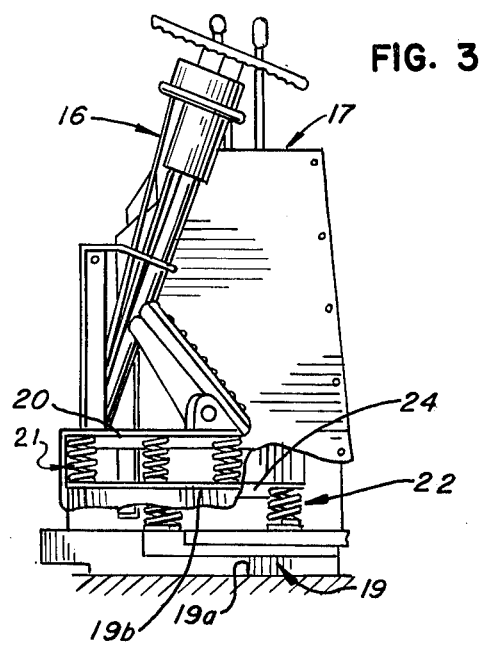
FIG. 3 is a fragmentary vertical elevation of the controls as mounted on the frame prior to the installation of the cab thereon.

Base 12 may be provided with a frame 19 adapted to carry the cab 13 and to support the controls 16 and 17 for use by the operator in the cab space 15. As shown in FIG. 3, the frame may include a first portion 19a for carrying the auxiliary hydraulic device control 17 and a second portion 19b for carrying the steering control 16. The invention contemplates the mounting of the controls 16 and 17 on the frame prior to the installation of the cab 13 thereon for facilitated assembly of the vehicle during manufacture thereof. Thus, the steering control 16 may be provided with a mounting plate 20 which may be resiliently mounted to the frame portion 19b by suitable resilient mounting means 21 and control 17 may be mounted to the frame portion 19a by similar resilient mounting means 22. Thus, the vehicle may be operated such as for moving the vehicle to different portions of the assembly line prior to the installation of the cab 13 therein.

Figure 4:
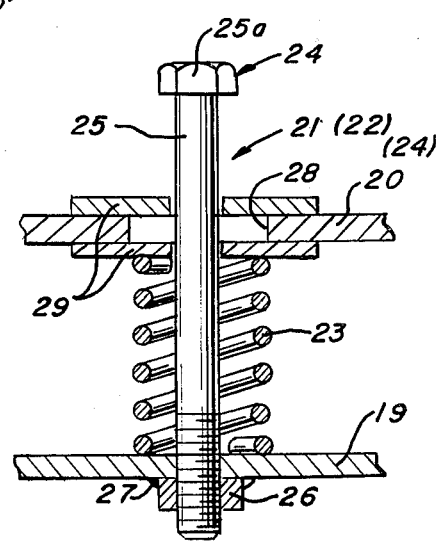
FIG. 4 is a fragmentary vertical elevation illustrating the resilient means for mounting the controls to the frame prior to the installation of the cab thereon.

Referring now more specifically to FIG. 4, the mounting means 21 (22) may comprise a compression spring 23 and a cooperating threaded means 24, including a bolt 25 and nut 26. Nut 26 may be secured as by welding 27 to the frame to permit the threaded securing of the bolt 25 thereto. As shown in FIG. 4, the mounting plate 20 (and corresponding mounting plate 24 of control 16) may be provided with a suitable opening 28 to permit passing of the bolt 25 axially through the spring 23 with the bolthead 25a disposed above the mounting plate, thereby to retain the spring 23 between the mounting plate and frame, as illustrated. Clamp plates 29 may be provided in overlying and underlying relationship to opening 28 to define a spring retainer and means for limiting the threading of the bolt through the nut 26.

Thus, the resilient mounting means 21 and 22 permit a resilient yet positive mounting of the steering control 16 and the hydraulic device control 17 to the frame prior to the installation of the cab 13 thereon so that the vehicle may be moved as desired by an operator for facilitated further assembly of the vehicle.

Figure 2:
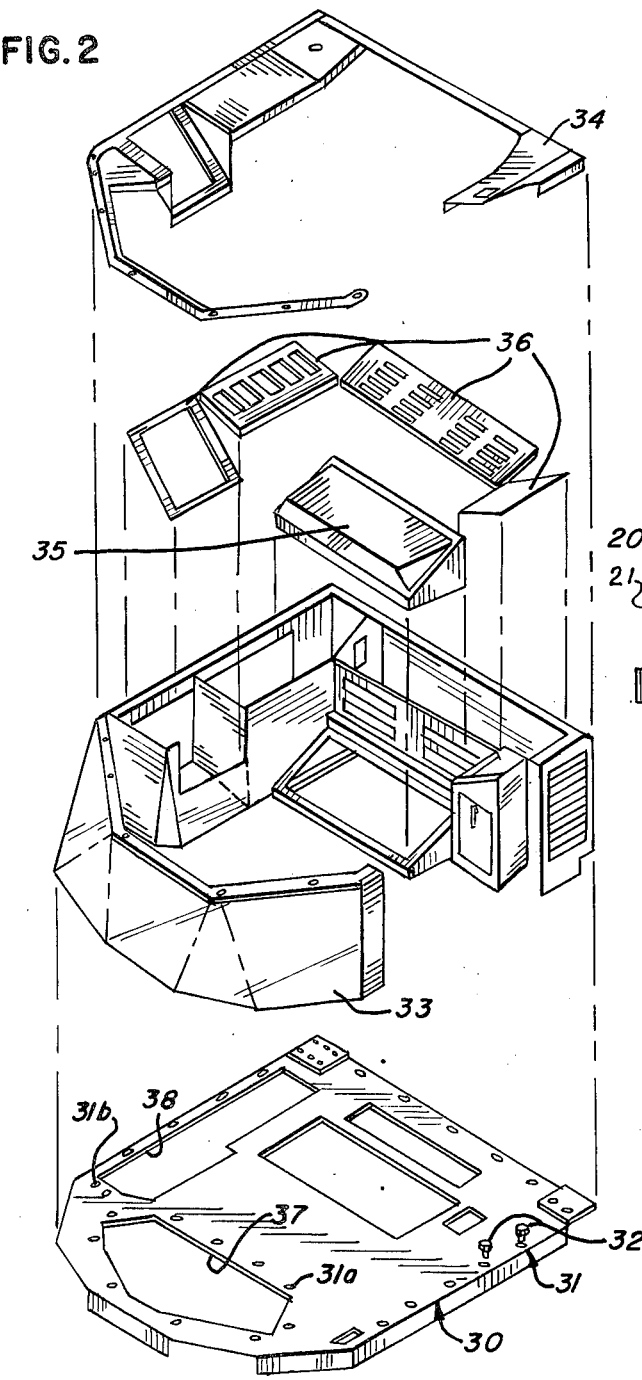
FIG. 2 is a fragmentary exploded view of the cab portion thereof.

The illustrated cab 13 is shown in exploded view in FIG. 2 to include a floor portion 30 which is adapted to be secured to the frame, by means of a plurality of bolt holes 31 in the floor portion adapted to receive suitable securing bolts, such as bolts 32.

As further shown in FIG. 2, the cab 13 defines an upright sidewall portion 33, and a cover portion 34. In addition, the cab may be provided with a conventional operator seat 35, and a plurality of cover plates 36. As indicated briefly above, it is one of the features of the present invention to provide a selectably assembleable cab construction which may utilize any one of a plurality of different cab portions, the cab 13 shown in the illustrated embodiment comprising only one such cab construction effectively comprising a universal platform arrangement.

As shown in FIG. 2, the floor portion 30 defines a plurality of openings, such as openings 37 and 38. Opening 37 is adapted to permit the upward extension therethrough of the steering control 16 and opening 38 is adapted to permit the upward extension therethrough of the auxiliary hydraulic device control console 17.

As shown in FIG. 2, bolt holes 31 may include a group of holes 31a about the periphery of opening 37. Bolts 32 may be inserted through the openings 31a to be threaded to the mounting plate 20 of the steering control, thereby providing a rigid mounting of the steering control to the frame 19 through the floor portion of the cab 13. Similarly, bolt holes 31b may be provided adjacent the opening 38 for rigidly securing the console 17 to the floor portion 30 of the cab, thereby effectively rigidly securing the console 17 to the frame 19.

Upon the rigid securing of the controls to the cab and thus to the frame, the resilient mounting means 21 and 22 may be removed as desired. The resilient mounting means permits a facilitated mounting of the cab structure to the frame by permitting facilitated adjustment of the mounting plates 20 and 24 relative to the cab structure when the cab is installed on the frame. However, during the time prior to the installation of the cab, the controls 16 and 17 are available to the assembling personnel for facilitated maneuvering of the vehicle to provide facilitated assembly thereof.

Thus, the present invention provides an improved means for temporarily mounting a plurality of controls in a vehicle for use during assembly of the vehicle in maneuvering the wheeled portion thereof. The invention further comprehends the provision of a selectively assembleable cab structure which, when assembled to the frame of the vehicle, permits rigid mounting of the controls thereto, obviating the further need for the resilient mounting means which may be removed as desired.

The foregoing disclosure of specific embodiments is illustrative of the broad inventive concepts comprehended by the invention.

The embodiments of the invention in which an exclusive property or privilege is claimed are defined as follows:

1. In a vehicle having a frame and vehicle operating controls adapted for floor mounting, the improvement comprising:
    resilient mounting means for supporting the controls on the frame;
    a cab having a floor portion provided with openings adapted to permit a first portion of said controls to extend upwardly therethrough and a portion of said floor portion adapted to engage said controls as an incident of said cab being set upon said frame; and
    securing means for rigidly securing the cab to the frame and rigidly securing said controls to the cab, said resilient mounting means providing adjustable support of said controls for facilitated securing of the controls to the cab by said securing means.

2. The vehicle structure of claim 1 wherein said cab further includes a housing portion surmounted to said floor portion, and additional securing means for securing said housing portion to said frame.

3. The vehicle structure of claim 1 wherein said cab further includes a housing portion surmounted to said floor portion, and additional securing means for securing said housing portion to said frame, said housing portion defining wall means for enclosing portions of said controls extended upwardly through said floor portion.

4. The vehicle structure of claim 1 wherein said resilient mounting means comprises removable threaded support means and cooperating spring means.

5. The vehicle structure of claim 1 wherein said resilient mounting means comprises spring means compressively received between said frame and cab floor portion.

6. The vehicle structure of claim 1 wherein said resilient mounting means comprises spring means compressively received between said frame and cab floor portion, and bolt means retaining the floor portion to the frame with the spring means resiliently compressed.

7. The vehicle structure of claim 1 wherein said controls include a hydraulic control console, said cab housing portion defining an enclosure for said console.

8. The vehicle structure of claim 1 wherein said controls include vehicle steering controls having a base plate mounted to said frame by said resilient mounting means.

9. The vehicle structure of claim 1 wherein said controls include vehicle steering controls having a base plate rigidly mounted to said cab by said securing means.

10. The vehicle structure of claim 1 wherein said cab includes a plurality of housing portions severally assembled to said floor portion.

11. The vehicle structure of claim 1 wherein said cab includes any one of a plurality of different housing portions selectably assembled to said floor portion.

12. The vehicle structure of claim 1 wherein said vehicle is provided with a steering mechanism and auxiliary hydraulic device, and said controls include vehicle steering controls and hydraulic operator controls for controlling said steering mechanism and auxiliary hydraulic devices.

13. The vehicle structure of claim 1 wherein said mounting means is arranged to be removed upon the rigid securement of the cab to the frame.

14. The vehicle structure of claim 1 wherein said mounting means include removable clamping plates and resilient clamping means extending between said plates and frame.

* * * * *